April 3, 1934.  R. H. CARTER  1,953,700
CABINET DRYING RACK
Filed July 18, 1932  7 Sheets-Sheet 5
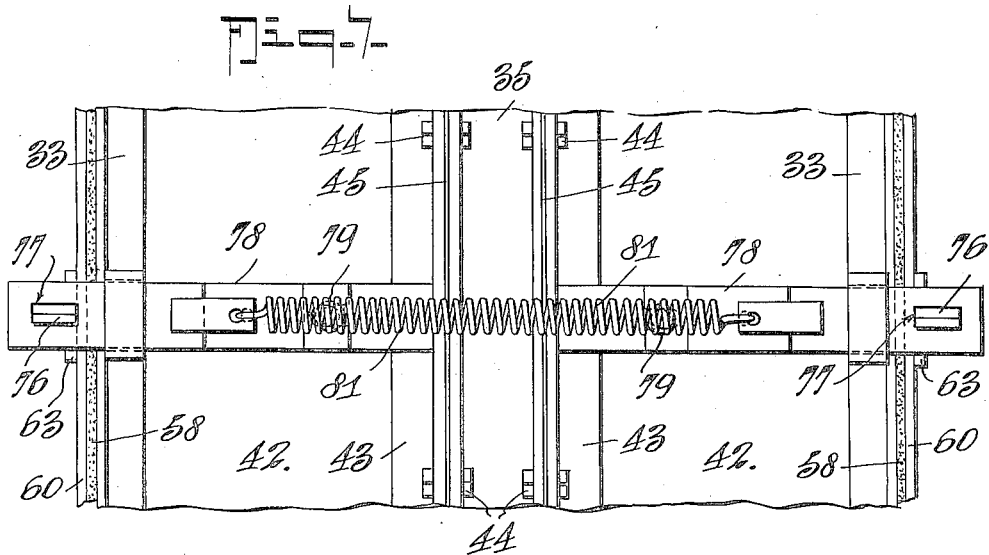
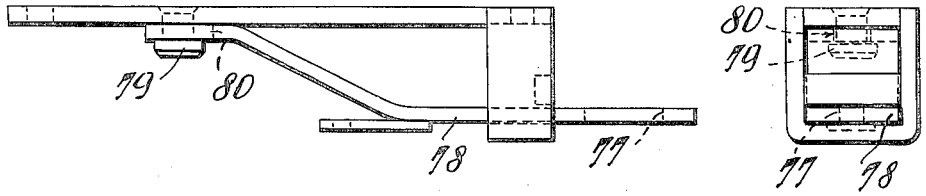
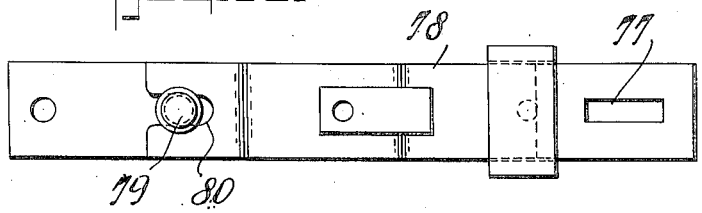
Inventor
Ralph H. Carter.
By Thomas H. Byron
Attorney

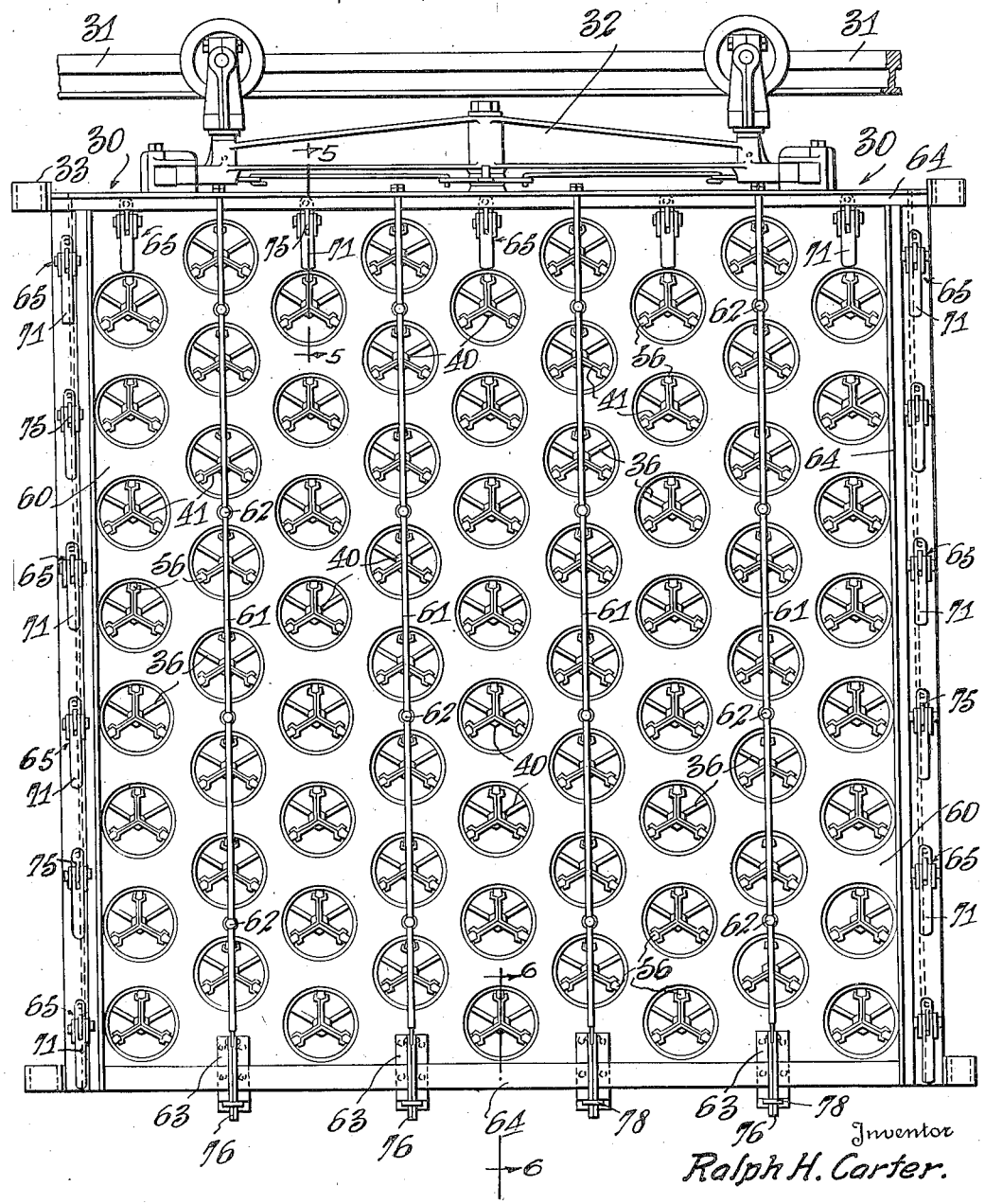

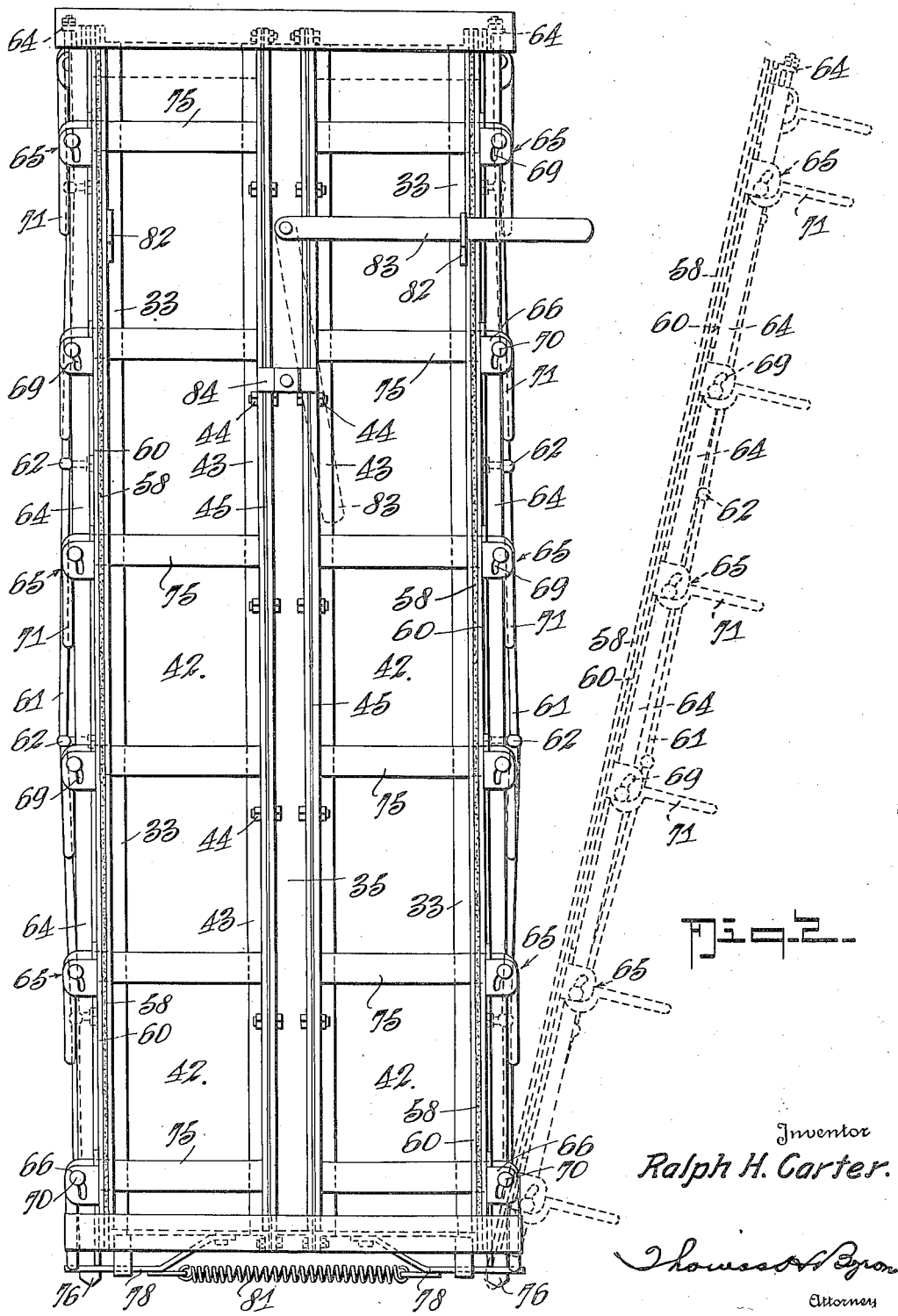

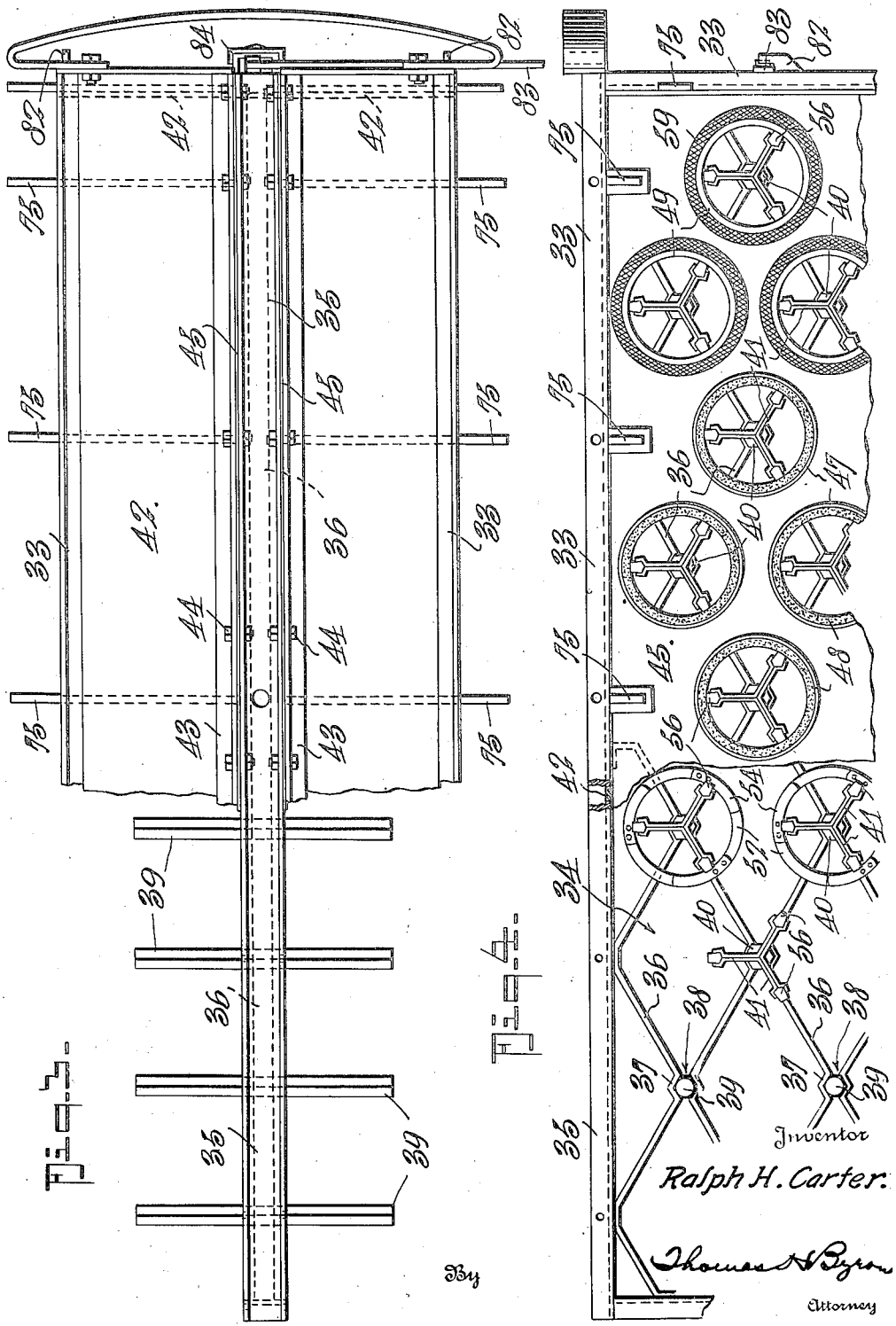

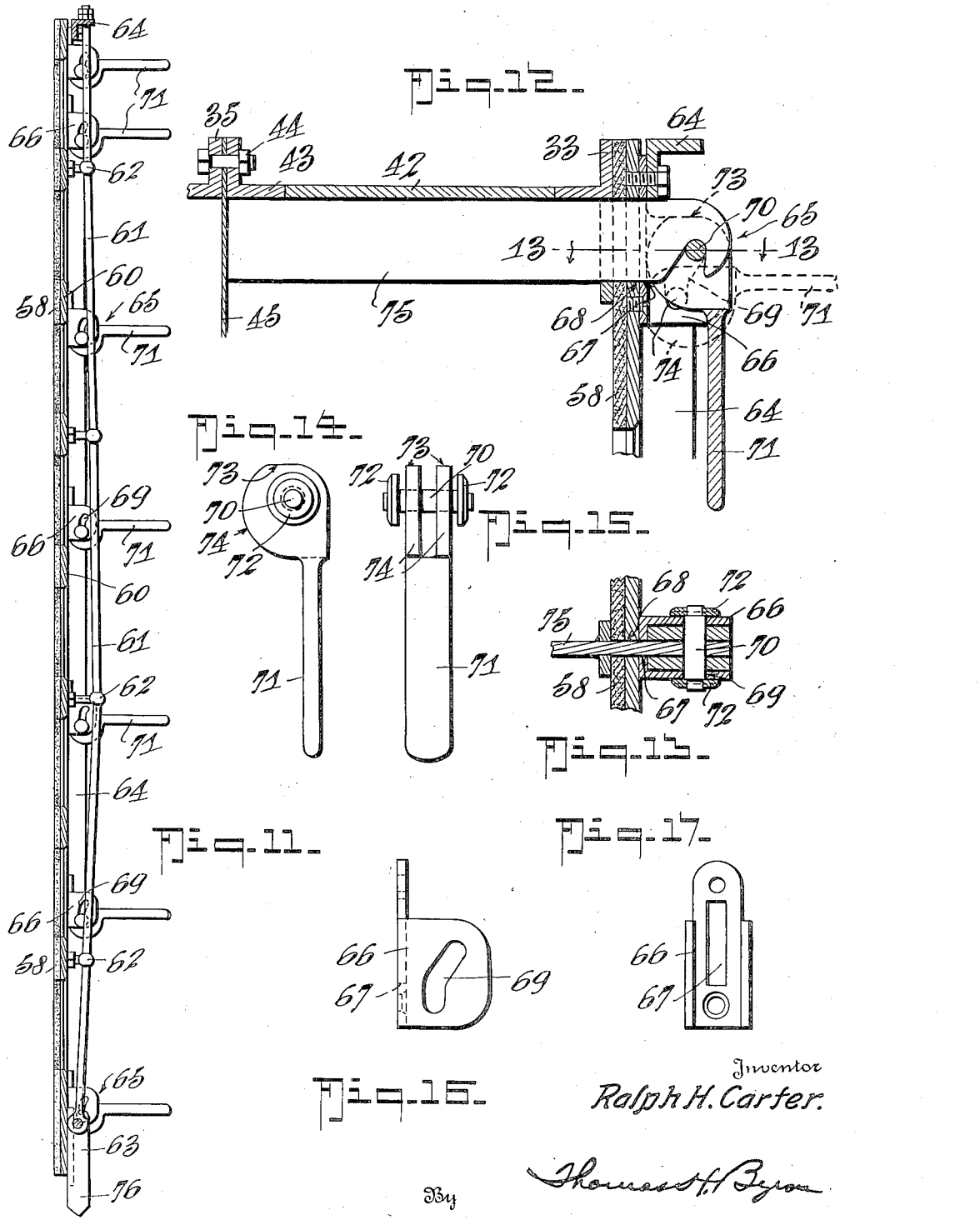

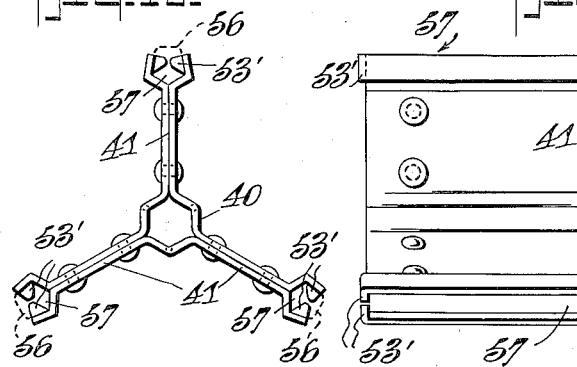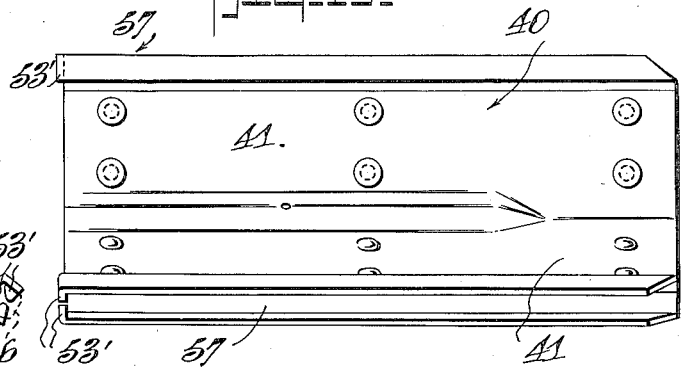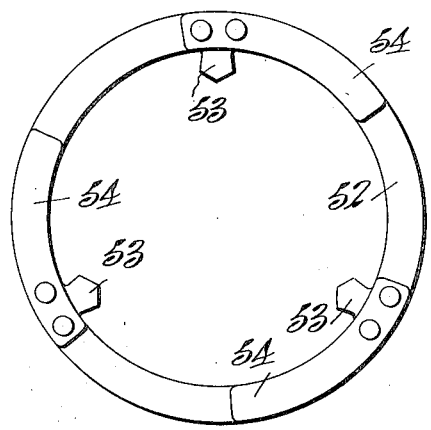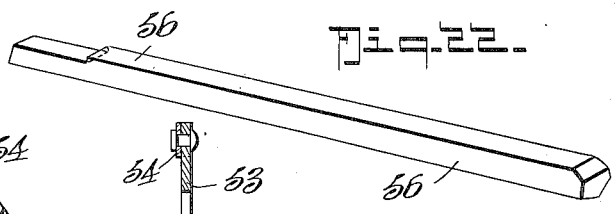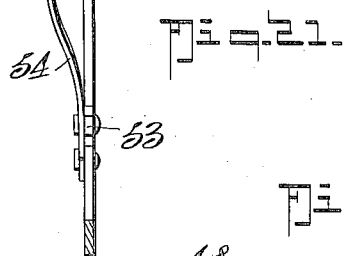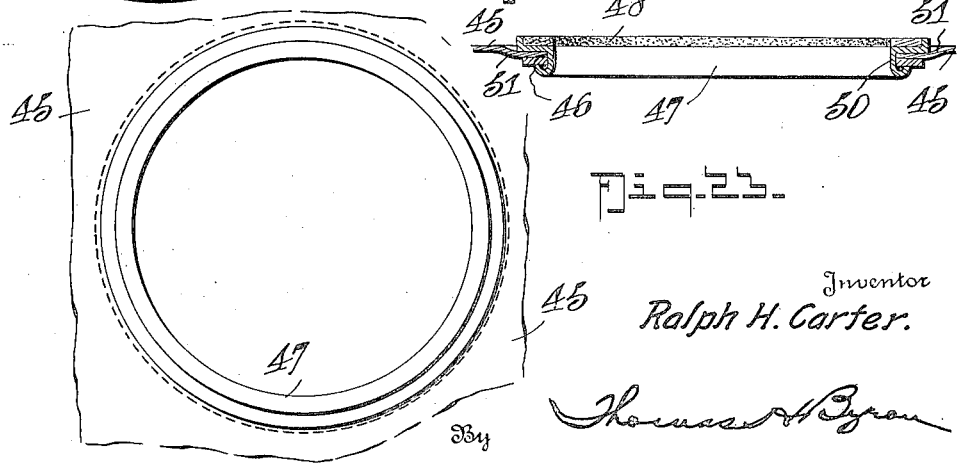

Patented Apr. 3, 1934

1,953,700

UNITED STATES PATENT OFFICE 1,953,700

CABINET DRYING RACK

Ralph H. Carter, Johnson City, Tenn., assignor to American Glanzstoff Corporation, New York, N. Y., a corporation of Delaware Application July 18, 1932, Serial No. 623,259

28 Claims. (Cl. 34—26)

My present invention relates to improvements in the handling or treating of artificial silk and the like, and more particularly to an improved apparatus for the handling of spools of artificial silk and the like whereby the yarn bodies on the spools will be dried throughout the drying operation in one direction only.

In the drying of artificial threads and/or filaments it has been found that, as the drying medium is allowed to circulate freely both on the inside and the outside of the spooled thread body at the same time, certain disadvantages will arise. In the first place the outer and inner layers of the yarn body will dry first, the outer layers drying slightly sooner than the inner layers due to the fact that the inner layers are against the surface of the spool, and the drying medium must therefore first heat the spool to a certain extent before the drying of these layers starts taking place. The outer layers will, therefore, dry against a comparatively rigid wet yarn body which will prevent the proper shrinkage of those layers. Similarly the inner layers will be dried under a tension since they dry against the rigid spool body which will also prevent the proper shrinkage of those layers. As a final result, a body of thread and/or filaments dried in accordance with the usual practice will be composed of a yarn body having uneven shrinkage, i. e., the innermost layers which because of the rigid spool body, will naturally dry under tension; outermost layers which have also been prevented from properly shrinking due to the counter resistance of the central layers which, during the first stages of the drying of the outer layers, will be still in a comparatively wet state, and central layers which having dried last will therefore have an opportunity to dry under more favorable conditions.

It has been found that, when a straight shrinkage line, or even shrinkage is desired when using air at comparatively low humidities, the drying of the thread body should be done from the inside outwardly. By this method the layers of yarn bearing against the spool body will dry first, and each successive layer reducing slightly in diameter during the drying operation will allow the yarn on the extreme outside of the yarn package to shrink properly. The reduction in the diameter of each succeeding layer of yarn therefore, provides more space for the next layer of yarn to shrink and hence there will be a gradual decrease in the circumference of each layer of yarn as the yarn body dries from the inside to the outside.

In view of such discovery a new method of drying threads and/or filaments wound upon spools has been developed and consists essentially in that the threads and/or filaments wound upon rigid spools are allowed to dry from the inside to the outside only, then twisted or otherwise treated so that the thread and/or filaments formerly on the outside of the spool are placed on the inside of the spool and moistened and redried the second time from the inside only, similar to the first drying operation. Such treatment will result in the production of a yarn body which is evenly shrunk throughout. If use is made of "collapsible spools" in carrying out this method, the remoistening and redrying operations are omitted, since the inner layers will not be dried under tension due to the fact that allowance is made for the proper contraction of the inner layers of yarn upon removing the spool from the contractible spinning machine spool holder, part of which contraction takes place during wet treating and the balance during the drying operation. This method may also be applied when drying pot spun yarn in cake form.

This new process is not being claimed per se in the present application but is fully covered by co-pending applications. A study of the two new types of drying above described will show that in the first method the innermost filaments dry first, and the intermediate filaments, and then the outermost filaments, in other words a gradual drying from the inside to the outside of the yarn body. When the thread is rewound and rewet or remoistened, and redried, from the inside toward the outside, it will be found that the thread is substantially evenly shrunk throughout its length. Regarding the second method where spools with a reduceable winding surface are employed only a single drying, from the inside to the outside of the thread body, need be performed. Here the innermost, intermediate and outermost threads dry successively and thus afford an opportunity for even drying and even shrinkage of the entire yarn body.

Accordingly, one object of my present invention is to provide a suitable drying device for carrying out the process noted above.

Another object of my present invention is to provide a device which will permit the economical handling of a plurality of spools at one time.

A still further object of my present invention is to provide a device for handling spools of artificial threads and the like during drying which will also act as a carrying means for a plurality of wound spools.

A further object of my present invention is to provide a cabinet drying rack so arranged and constructed as to seal the outside of a spool in a practically air tight chamber and leave the inside of the spool open for the free circulation of air heated to a predetermined temperature and moving at a predetermined velocity.

A still further object of my present invention is to provide a cabinet drier having a central spring or other actuated diaphragm which will automatically compensate for spools of varying lengths, thereby sealing the outside of all the spools carried by the rack in a practically air tight chamber.

These and other objects of my present invention will become more apparent from a study of the following description and by reference to the attached drawings, in which:

Figure 1 is a side elevation of the cabinet drying rack secured to a suitable mono-rail system by means of a suitable swivel connecting device;

Figure 2 is an end elevation thereof showing one of the cover plates for the cabinet drier swung partially out of operative position;

Figure 3 is a top plan view thereof, certain portions being broken away;

Figure 4 is a detail side elevation of the top portion of the cabinet drier, certain portions being broken away to show the construction of the flexible diaphragm;

Figure 7 is a detail view showing the arrangement used to hold the bottom portions of the side plates of the cabinet in position;

Figure 8 is a detail view of the bracket construction shown in Figure 7;

Figure 9 is an end elevation thereof;

Figure 10 is a bottom plan view thereof;

Figure 11 is a sectional view of one of the cover plates;

Figure 12 is a sectional view of one of the locking means used to secure the cover plates to the rack;

Figure 13 is a sectional view taken along the lines 13—13 of Figure 12;

Figure 14 is a side elevation of the locking handle;

Figure 15 is an end elevation thereof;

Figure 16 is a side elevation of the latch;

Figure 17 is an end elevation thereof;

Figure 18 is an end elevation of the spool holder;

Figure 19 is a side elevation thereof;

Figure 20 is a top plan view of the backing ring secured to the spool holder;

Figure 21 is a vertical sectional view thereof;

Figure 22 is a perspective view of one of the inserts used with the spool holder;

Figure 23 is a top plan view of a portion of the flexible diaphragm; and

Figure 24 is a sectional view showing the manner in which the metallic ring is secured to the diaphragm.

Figure 5:
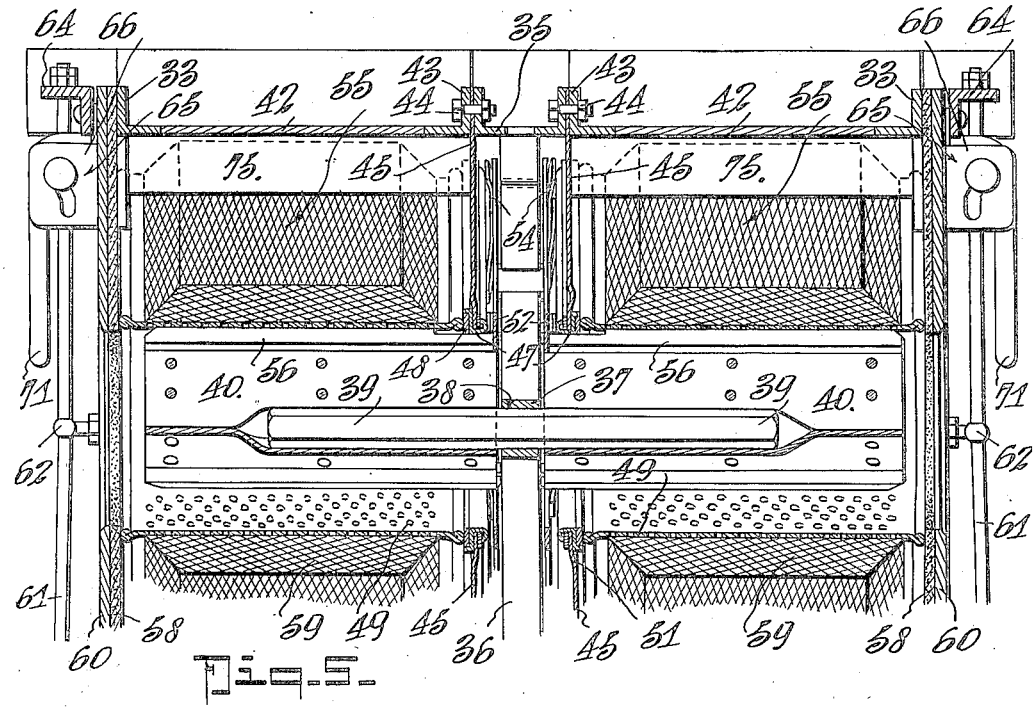
Figure 5 is a vertical sectional view taken along the lines 5—5 of Figure 1.

Referring now more particularly to the drawings in which like numerals indicate like parts, I have shown my new cabinet drying rack 30 secured to a mono-rail track 31 by means of a load bar 32 to which the rack is swivelly connected. The details of this construction form no part of my present invention, being fully disclosed and claimed in my copending application, Ser. No. 629,376, filed August 18, 1932. The rack is constructed in the form of an open box-like frame 33 having secured thereto along the vertical median axis thereof a grille 34 consisting of a U-frame 35 provided with a plurality of metal strips 36 running in a horizontal direction of said frame. Each strip is zig-zag in form and the point of each bend is V-shaped as shown at 37 so that openings 38 are provided by the adjacent bends of the strip to receive the bars or rods 39 to which the spool holders 40 provided with three legs 41 are secured. To insure a rigid network the rods or bars are welded, or otherwise rigidly secured to the metal strips.

Figure 6:
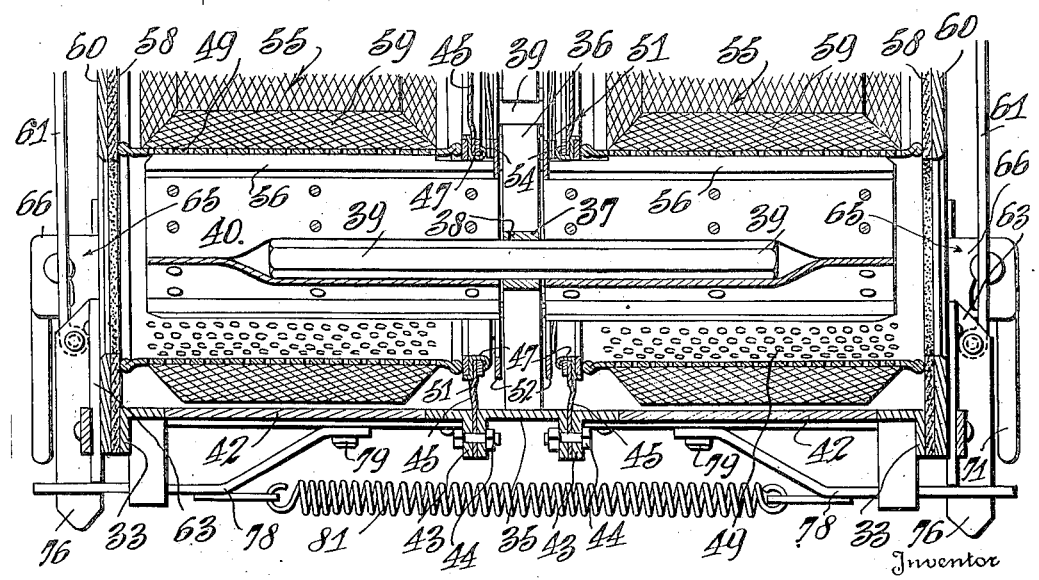
Figure 6 is a similar view, but taken along the lines 6—6 of Figure 1.

As is clearly shown in Figures 2, 3, 5 and 6, the top, bottom and ends of the box-like frame 33 are covered with suitable plates 42 which are welded or otherwise secured to angle members 43 which in turn are secured to the legs of the U-frame 35 and to the sections of the frame by means of bolts 44. Located adjacent each side of the grille and secured between the joint formed by the angle members 43 and legs of the U-frame is a flexible diaphragm 45 made of any suitable impermeable flexible material. These diaphragms are provided with openings 46 which are located coaxially with respect to the spool holders 40 and the holding bars or rods 32 which extend at an angle of 90° to the grille. To provide an effective seal between the beaded edge of each spool and the respective opening in the diaphragm, I have provided a suitable metallic ring or eyelet 47 having a diameter greater than that of the opening in the diaphragm. To this ring is secured a felt washer or ring 48 against which the beaded edge of the spool 49 rests. The inner edge of the ring 47 is provided with a flange which holds in position a backing ring 50. Because of the fact that the diameter of the ring or eyelet 47 is larger than that of the opening in the diaphragm, the edges of each opening in the diaphragm will be crimped or bulged outwardly from said grille as shown at 51 (Figures 5, 6 and 22), when the ring is secured in position. This construction permits the flexible diaphragm to accommodate itself to spools of varying length since the crimped edges take up substantially all of the pressure without distorting the material of the diaphragm between the adjacent openings. A ring 52 is secured at the inner end of each of the spool holders by means of inwardly projecting lugs 53, which fit in slots formed in the spool holders. These rings are also provided with a plurality of spring members 54 which, bearing against the inner walls of the diaphragms, tend to force the same outwardly. Consequently, the felt washer surrounding each opening is maintained in contact with the beaded edge of the spool, thereby providing at all times an effective seal. These diaphragms, therefore, form the inner walls respectively of two substantially air-tight chambers 55. As will be noted from an inspection of Figure 22, the inner end of each insert 56 slidably secured in slots 57 formed in the spool holders is cut away so as to engage the lugs carried by the ring without distorting the diaphragm.

The outer walls of said chambers comprise plates 60 movably secured to the sides of the box-like frame 33 by means to be hereinafter more fully described. These plates are made preferably of aluminum, although any substance may be used which is light in weight. A backing strip 58 of felt is secured to the plates and both the plates and felt are provided with a series of openings smaller in diameter than the spool holder, an opening being provided for each spool holder. As will be noted from an inspection of Figures 5 and 6, these openings are co-axially arranged with respect to the spool holders and openings in the flexible diaphragms so that a plurality of continuous openings are provided through the cabinet rack to permit of a free passage of the drying medium therethrough and to permit of the drying of the thread bodies 59 carried by the spools from the inside only. The felt backing 58 contacting with the outer ends of the spools, prevents the ingress of the drying medium into the air-tight chambers and also retards the heat transfer through the aluminum plates 60. By reason of the spring members 54 carried by the rings 52 variations in the length of the spools carried by the spool holders will be compensated for without breaking the seal between the diaphragm and the plates. In practice such variations in the length of the spools is not unusual.

To prevent buckling or warping of the plates 60 which are comparatively thin, I have provided a plurality of vertically disposed truss rods 61 which are secured to the said plates at spaced intervals by adjustable bolts 62. The lower ends of each of the rods are secured in any suitable manner to brackets 63. As will be noted from an inspection of Figure 2, these rods are preferably bolted in close to the bottom and top of the plates and are bowed outwardly at the center thereby maintaining the plates substantially flat throughout their area, and thereby preventing distortion or deflection of the plate by the combined load exerted by the springs which face the diaphragm outwardly at all times and maintain the air tight seal between the plates and the outside ends of the spools. By bowing the truss member 61 outwardly as shown in Figs. 2 and 11 of the drawings a force is exerted on the cover plate 60 which tends to bow the plate 60 inwardly due to the tendency of the truss member 51 to straighten out. This counter-force, therefore, neutralizes the combined pressure on the plate which is caused by the resilient means 54. It is therefore seen that the greatest stress on the plate is in the center where it is unsupported by the locking devices and it is at this point that the truss member exerts its greatest pressure.

In the assembly of the rack the spool holders are first secured to the supporting bars or rods 39 carried by the central grille. The rings 52 carrying the spring members are then secured to the inner ends of the spool holders by the lugs 53, the inward movement thereof being limited by coacting stops 53'. The non-metal inserts are then placed in the slots formed on the spool holders and the diaphragms are then located in position. Because of the fact that the inner ends of the inserts are cut away the movements of the diaphragms may take place without injury to the eyelets or the fabric of the diaphragms.

The plates are provided at the top, bottom and ends with angle members 64 which serve as reinforcement and also to direct the air currents toward the openings formed therein. Locking members 65 are secured at spaced intervals about the top and ends of the plates and each comprise a U-shaped bracket 66 having a slot 67 formed therein which coincides with a corresponding slot 68 formed in the plates. The legs of each bracket are provided with angular shaped slots 69 in which ride a rod 70 having rigidly secured thereto a bifurcated handle 71. Lateral movement of the said rod in the slots is prevented by any suitable means, such as by washers 72.

As will be noted from an inspection of Figure 14, the end of each furcation is provided with a vertical surface 73 merging into a rounded portion 74. By virtue of this construction, each handle will be maintained in a horizontal position by the vertical wall 73 contacting against the plate and upon movement of the handle into a vertical position, the rounded portion 74 thereof bearing against the plate will hold the rod 70 in the upper portion of the angular slot and engage in locking position in one of the hooked members 75 mounted on the sides and top of the frame 33 which project through the slots formed in the plate and U-bracket. The lower portion of each bracket 63 is provided with a projecting lug 76 which engages in a correspondingly shaped slot 77 formed in a bracket 78 movably mounted on the bottom of the cabinet by means of bolts 79 riding in the elongated slots 80. A spring 81 is secured to oppositely disposed brackets and tends to pull the bottom of the plates inwardly. The movement of these lower brackets 78 allows the plates to be pivotally swung thereon, as shown in Figure 2 when being removed from or taken off the rack proper.

In securing each plate to the rack, the lugs are first positioned in the slots formed in the brackets 78. The operator then starts to lock the ends of the plate in position by grasping the handles 71 and moving them into a vertical position starting with the lower two oppositely positioned handles and working upwardly to the top. Such movement swings the rods 72 into the upper position of their respective slots, thereby engaging the said rods in the hooked members 75. The rounded portions 74, acting as cams, serve to maintain the rods in engagement with the hooks. The top wall of the plate is then locked to the frame by a corresponding movement of the locking members, the outer locking members being first moved into vertical position. As the plate is gradually locked in position, the springs 81 will permit a slight movement outwardly of the movably mounted brackets thereby permitting the exact centering of the plate on the frame.

Since a plurality of cabinet drying racks are placed in the drier it is preferable that they be so positioned with respect to each other as not to interfere with the currents of the drying medium in the drier. To insure a proper alinement of the drying cabinets, I have provided two spaced brackets 82 at each end of each cabinet rack and have provided a pivotally mounted lever 83 at one end of each cabinet rack, which, in horizontal position, will project on either side thereof. The projecting portion of each lever will engage in one of the brackets of an adjacent cabinet rack and thereby insure the proper alinement of the cabinet rack with respect to each other and permit a free passage of the drying medium through a plurality of such cabinet racks. To prevent damage to the pivotally mounted lever when not being used, I have provided a bracket 84 which will hold the said lever in a substantially vertical position.

From the above description it will be readily appreciated that I have provided an improved rack for spools so arranged and constructed as to permit the drying of the yarn bodies on said spools from the inside to the outside only, which is simple in construction and efficient in operation. The rack is usually secured to a mono-rail track so that the ready handling thereof may be had. If desired, however, the rack may be equipped with wheels or rollers.

Although I have described a preferred embodiment of my invention, it will be apparent that many changes in the details of construction of the rack may be made without departing from the spirit of my invention.

What I claim as new is:

1. A cabinet drying rack comprising, in combination, a frame having secured thereto top, bottom, and end plates, a grille located centrally thereof, spool holding means projecting from both sides of said grille, a diaphragm located on each side of said grille and secured to said frame and having openings formed therein coaxially alined with said holding means, cover plates secured to the sides of said frame having a plurality of openings formed therein coaxially alined with the openings in said diaphragms whereby open air passages are formed through the said rack.

2. A cabinet drying rack comprising, in combination, a frame having secured thereto top, bottom and end plates, a grille located centrally thereof, spool holders secured thereto at spaced intervals and extending at right angles thereto, a flexible, impermeable diaphragm located on each side of said grille having openings formed therein in alinement with said holders, a ring secured in each of said openings of a diameter greater than that of said openings whereby the material of the diaphragm surrounding each opening is crimped outwardly around said ring, cover plates for said frame provided with openings in alinement with the openings in said diaphragm, whereby when spools are placed on said holders the cover plates force the said spools against said diaphragms, the crimped portions around the openings therein preventing leakage between said diaphragms and spools.

3. A cabinet drying rack comprising, in combination, a frame having secured thereto top, bottom and end plates, a grille located centrally thereof, spool holders secured thereto at spaced intervals and extending at right angles thereto, a flexible, impermeable diaphragm located on each side of said grille having openings formed therein in alinement with said holders, a ring secured in each of said openings of a diameter greater than that of said openings whereby the material of the diaphragm surrounding each opening is crimped outwardly around said ring, resilient means associated with said holders and adapted to force said diaphragms outwardly, cover plates for said frame provided with openings in alinement with the openings in said diaphragm, whereby when spools are placed on said holders the cover plates force the said spools against said diaphragms, the crimped portions around the openings therein preventing leakage between said diaphragms and spools.

4. A cabinet drying rack comprising, in combination, a frame having secured thereto top, bottom and end plates, a grille located centrally thereof, spool holders secured thereto at spaced intervals and extending at right angles thereto, a flexible, impermeable diaphragm located on each side of said grille having openings formed therein in alinement with said holders, a ring secured in each of said openings of a diameter greater than that of said openings whereby the material of the diaphragm surrounding each opening is crimped outwardly around said ring, resilient means associated with said holders and adapted to force said diaphragms outwardly, sealing means carried by said ring and located on the outer surface of the diaphragm, cover plates for said frame provided with openings in alinement with the openings in said diaphragm, whereby when spools are placed on said holders the cover plates force the said spools against said diaphragms, the crimped portions around the openings therein preventing leakage between said diaphragms and spools.

5. A cabinet drying rack comprising, in combination, a frame having secured thereto top, bottom and end plates, a grille located centrally thereof, spool holders secured thereto at spaced intervals and extending at right angles thereto, a flexible, impermeable diaphragm located on each side of said grille having openings formed therein in alinement with said holders, a ring secured in each of said openings of a diameter greater than that of said openings whereby the material of the diaphragm surrounding each opening is crimped outwardly around said ring, sealing means carried by said ring and located on the outer surface of said diaphragm, cover plates for said frame provided with openings in alinement with the openings in said diaphragm, whereby when spools are placed on said holders the cover plates force the said spools against said diaphragms, the crimped portions around the openings therein preventing leakage between said diaphragms and spools.

6. A cabinet drying rack comprising, in combination, a frame provided with top, bottom, and end plates, a foraminated member extending centrally thereof, spool holders projecting at right angles from said member, a flexible diaphragm located on each side of said member and provided with openings in alinement with said spool holders, cover plates having a plurality of openings in alinement with the openings in said diaphragms, means to lock said cover plates to said frame comprising a plurality of hook shaped members projecting through correspondingly shaped slots formed in said cover plates, and means carried by said cover plates adapted to engage said hook shaped members.

7. A cabinet drying rack comprising a box-like frame open at its sides, a grille secured centrally thereof, holders secured thereto and projecting at right angles therefrom, a flexible, impermeable diaphragm provided with openings in alinement with said holder, means associated with said holder to force said diaphragms outwardly, cover plates for the sides of said frame having openings in alinement with the openings of said diaphragm, means to secure said plates to said sides, whereby when yarn packages are placed on said holders a substantially air-tight seal is maintained between the ends of said package and the diaphragms and cover plates so that when a drying medium is circulated through the openings in said cabinet drying rack the yarn packages will be dried from the inside to the outside only.

8. In a cabinet drying rack including a box-like frame open at its sides, and cover plates for said sides, means for locking said cover plates to said rack comprising a plurality of hooks on said rack and located at spaced intervals on the sides and tops of said frame and projecting through correspondingly shaped slots in said cover plates, brackets secured adjacent said slots provided with slots, handles associated with said brackets and provided with rods riding in said slots, whereby when said rods are moved upwardly in said slots the said rods engage said hooks, said handles being so shaped as to maintain said rods in locking position with said hooks, downwardly projecting lugs at spaced intervals along the bottom edges of said plates, and means located at spaced intervals along the bottom of said frame in which said lugs engage.

9. In a cabinet drying rack including a box-like frame open at its sides, and cover plates for said sides, means for locking said cover plates to said rack comprising a plurality of hooks on said rack and located at spaced intervals on the sides and tops of said frame and projecting through correspondingly shaped slots in said cover plates, brackets secured adjacent said slots provided with slots, handles associated with said brackets and provided with means riding in said slots, whereby when said means are moved upwardly in said slots the said means engage said hooks, said handles being so shaped as to maintain said means in locking position with said hooks downwardly projecting lugs located at spaced intervals along the bottom edges of said plates, and means located at spaced intervals along the bottom of said frame in which said lugs engage.

10. In a cabinet drying rack including a box-like frame open at its sides, and cover plates for said sides, means for locking said cover plates to said rack comprising a plurality of hooks on said rack and located at spaced intervals on the sides and tops of said frame and projecting through correspondingly shaped slots in said cover plates, brackets secured adjacent said slots provided with slots, handles associated with said brackets and provided with means riding in said slots, whereby when said means are moved upwardly in said slots the said means engage said hooks, said handles being provided with cam surfaces contacting with said plates to maintain said means in locking position with said hooks, downwardly projecting lugs located at spaced intervals along the bottom edges of said plates, and means located at spaced intervals along the bottom of said frame in which said lugs engage.

11. In a cabinet drying rack including a box-like frame open at its sides, and cover plates for said sides, means for locking said cover plates to said rack comprising a plurality of hooks on said rack and located at spaced intervals on the sides and tops of said frame and projecting through correspondingly shaped slots in said cover plates, brackets secured adjacent said slots provided with slots, handles associated with said brackets and provided with means riding in said slots, whereby when said means are moved upwardly in said slots the said means engage said hooks, said handles being so shaped as to maintain said means in locking position with said hooks, downwardly projecting lugs located at spaced intervals along the bottom edges of said plates, and movable means resiliently mounted and located at spaced intervals along the bottom of said frame in which said lugs engage for forcing said cover plates against the bottom of said frame.

12. In a cabinet drying rack including a box-like frame open at its sides, and cover plates for said sides, means for locking said cover plates to said rack comprising a plurality of hooks on said rack and located at spaced intervals on the sides and tops of said frame and projecting through correspondingly shaped slots in said cover plates, brackets secured adjacent said slots provided with slots, handles associated with said brackets and provided with means riding in said slots, whereby when said means are moved upwardly in said slots the said means engage said hooks, said handles being provided with cam surfaces contacting with said plates to maintain said means in locking position with said hooks, downwardly projecting lugs located at spaced intervals along the bottom edges of said plates, and tension actuated means located at spaced intervals along the bottom of said frame in which said lugs engage for forcing said cover plates against the bottom of said frame.

13. In a cabinet drying rack including a box-like frame open at its sides, and cover plates for said sides, means for locking said cover plates to said rack comprising a plurality of hooks on said rack and located at spaced intervals on the sides and tops of said frame and projecting through correspondingly shaped slots in said cover plates, brackets secured adjacent said slots provided with slots, handles associated with said brackets and provided with means riding in said slots, whereby when said means are moved upwardly in said slots the said means engage said hooks, said handles being so shaped as to maintain said means in locking position with said hooks, downwardly projecting lugs located at spaced intervals along the bottom edges of said plates, and spring actuated means located at spaced intervals along the bottom of said frame in which said lugs engage.

14. In a cabinet drying rack including a box-like frame open at its sides, and cover plates for said sides, means for locking said cover plates to said rack comprising a plurality of hooks on said rack and located at spaced intervals on the sides and tops of said frame and projecting through correspondingly shaped slots in said cover plates, brackets secured adjacent said slots provided with slots, handles associated with said brackets and provided with means riding in said slots, whereby when said means are moved upwardly in said slots the said means engage said hooks, said handles being provided with cam surfaces contacting with said plates to maintain said means in locking position with said hooks, downwardly projecting lugs located at spaced intervals along the bottom edges of said plates, and spring actuated means located at spaced intervals along the bottom of said frame in which said lugs engage.

15. In a cabinet drying rack including a box-like frame open at its sides, and cover plates for said sides, means for locking said cover plates to said rack comprising a plurality of hooks on said rack and located at spaced intervals on the sides and tops of said frame and projecting through correspondingly shaped slots in said cover plates, brackets secured adjacent said slots provided with slots, handles associated with said brackets and provided with means riding in said slots, whereby when said means are moved upwardly in said slots the said means engage said hooks, said handles being provided with cam surfaces contacting with said plates to maintain said means in locking position with said hooks, downwardly projecting lugs located at spaced intervals along the bottom edges of said plates, and tension actuated brackets provided with slots located at spaced intervals along the bottom of said frame in which said lugs are positioned.

16. A cabinet drying rack comprising a box-like frame open at its sides, a central partition provided with openings, spool holders secured thereto, flexible sheets secured adjacent each side of said partition and provided with openings in alinement with said holders, cover plates for said sides, having openings formed therein in alinement with the openings in said sheets, the distance between said sheets and plates being smaller than the length of the spools of yarn placed on said spool holders, means to lock said plates in position whereby the ends of the spools are sealed by said sheets and plates and whereby the yarn will be dried from the inside to the outside only when currents of air are circulated through the openings in the plates and sheets.

17. A cabinet drying rack comprising a box-like frame open at its sides, a central partition provided with openings, spool holders secured thereto, flexible sheets secured adjacent each side of said partition and provided with openings in alinement with said holders, eyelets secured in said openings carrying felt sealing rings, cover plates for said sides, having openings formed therein in alinement with the openings in said sheets, the distance between said sheets and plates being smaller than the length of the spools of yarn placed on said spool holders, means to lock said plates in position whereby the ends of the spools are sealed by said felt sealing rings and plates and whereby the yarn will be dried from the inside to the outside only when currents of air are circulated through the openings in the plates and sheets.

18. A cabinet drying rack comprising a box-like frame open at its sides, a central partition provided with openings, spool holders secured thereto, flexible sheets secured adjacent each side of said partition and provided with openings in alinement with said holders, resilient means associated with said holders to force said flexible sheets outwardly, cover plates for said sides, having openings formed therein in alinement with the openings in said sheets, the distance between said sheets and plates being smaller than the length of the spools of yarn placed on said spool holders, means to lock said plates in position whereby the ends of the spools are sealed by said sheets and plates and whereby the yarn will be dried from the inside to the outside only when currents of air are circulated through the openings in the plates and sheets.

19. A cabinet drying rack comprising a box-like frame open at its sides, a central partition provided with openings, spool holders secured thereto, flexible sheets secured adjacent each side of said partition and provided with openings in alinement with said holders, eyelets secured in said openings carrying felt sealing rings, resilient means associated with said holders to force said flexible sheets outwardly, cover plates for said sides, having openings formed therein in alinement with the openings in said sheets, the distance between said sheets and plates being smaller than the length of the spools of yarn placed on said spool holders, means to lock said plates in position whereby the ends of the spools are sealed by said felt sealing rings and plates and whereby the yarn will be dried from the inside to the outside only when currents of air are circulated through the openings in the plates and sheets.

20. In cabinet drying racks, means to maintain adjacent racks in alinement comprising brackets secured to the ends of said racks, levers pivotally mounted on said ends adapted to project beyond the sides of said racks and engaging brackets secured to adjacent racks.

21. In cabinet drying racks, means to maintain adjacent racks in alinement comprising brackets secured to the ends of said racks, levers pivotally mounted on said ends adapted to project beyond the sides of said racks and engaging brackets secured to adjacent racks, and means to maintain said levers against movement when in inoperative position.

22. A cabinet drying rack comprising a box-like frame open at its sides, a grille secured centrally thereof, holders secured thereto and projecting at right angles therefrom, flexible, impermeable diaphragms provided with openings in alinement with said holders, means associated with said holders to force said diaphragms outwardly, cover plates for the sides of said frame having openings in alinement with the openings of said diaphragms, vertically disposed truss members secured to said plates at spaced intervals, said truss members adapted to exert a bowing effect inwardly on said cover member in order to compensate for the warping or distortion of said plates caused by the combined forces exerted by said last mentioned forcing means, means to secure said plates to said sides, whereby when yarn packages are placed on said holders a substantially air-tight seal is maintained between the ends of said package and the diaphragms and cover plates so that when a drying medium is circulated through the openings in said cabinet drying rack the yarn packages will be dried from the inside to the outside only.

23. A cabinet drying rack comprising a box-like frame open at its side, a grille secured centrally thereof, holders secured thereto and projecting at right angles therefrom, a flexible, impermeable diaphragm provided with openings in alinement with said holders, means associated with said holders to force said diaphragms outwardly, cover plates for the sides of said frame having openings in alinement with the openings of said diaphragm, vertically disposed truss members adjustably secured to said plates at spaced intervals, said truss members comprising resilient rods attached to said cover plates by eye bolts whose eyes are spaced at varying distances from said plates thereby bowing said rods outwardly and exerting a bowing effect inwardly on said cover member in order to compensate for the warping or distortion of said plates caused by the combined force exerted by said last mentioned forcing means, means to secure said plates to said sides, whereby when yarn packages are placed on said holders a substantially air-tight seal is maintained between the ends of said package and the diaphragms and cover plates so that when a drying medium is circulated through the openings in said cabinet drying rack the yarn packages will be dried from the inside to the outside only.

24. A cabinet drying rack comprising a box-like frame open at its side, a grille secured centrally thereof, holders secured thereto and projecting at right angles therefrom, a flexible, impermeable diaphragm provided with openings in alinement with said holder, means associated with said holder to force said diaphragms outwardly, cover plates for the sides of said frame having openings in alinement with the openings of said diaphragm, means secured to said plates to deflect air currents to the openings formed therein, means to secure said plates to said sides, whereby when yarn packages are placed on said holders a substantially air-tight seal is maintained between the ends of said package and the diaphragms and cover plates so that when a drying medium is circulated through the openings in said cabinet drying rack the yarn packages will be dried from the inside to the outside only.

25. A cabinet drying rack comprising, in combination, a frame having secured thereto, top, bottom, and end plates, a foraminated partition located centrally thereof, spool holding means projecting from both sides of said partition, a flexible, impermeable diaphragm located on each side of said partition and secured to said frame and having openings formed therein coaxially alined with said holding means, cover plates secured to the sides of said frame having a plurality of openings formed therein coaxially alined with the openings in said diaphragm whereby open air passages are formed through the said rack.

26. A cabinet drying rack comprising, in combination, a frame having secured thereto, top, bottom and end plates, a foraminated partition located centrally thereof, spool holders secured thereto at spaced intervals and extending at right angles thereto, a flexible, impermeable diaphragm located on each side of said partition having openings formed therein in alinement with said holders, a ring secured in each of said openings of a diameter greater than that of said openings whereby the material of the diaphragm surrounding each opening is crimped outwardly around said ring, resilient means associated with said holders and adapted to force said diaphragm outwardly, cover plates for said frame provided with openings in alinement with the openings in said diaphragm, a gasket lining on said cover plates having openings in alinement with the openings in said cover plate, whereby when spools are placed on said holders the cover plates force the said spools against said diaphragm, the crimped portions around the openings adapted to allow said rings a limited movement independent of other portions of said diaphragm therein preventing leakage between said diaphragms and spools.

27. A cabinet drying rack comprising, in combination, an enclosed container open at its sides, a foraminated partition located centrally thereof, spool holding means projecting from both sides of said partition, a diaphragm means located on each side of said partition and secured to said container and having openings formed therein coaxially alined with said holding means for engaging yarn carrying spools positioned on said holding means, cover plates secured to and engaging the sides of said container and engaging the other ends of said spools whereby an approximately air tight chamber is formed surrounding said spools between each of said diaphragm means and cover plates.

28. A cabinet drying rack comprising, in combination, an enclosed container open at its sides, a foraminated partition located centrally thereof, spool holding means projecting from both sides of said partition, a flexible impermeable diaphragm means located on each side of said partition and secured to said container and having openings formed therein coaxially alined with said holding means for engaging yarn carrying spools positioned on said holding means, cover plates secured to and engaging the sides of said container and engaging the other ends of said spools whereby an approximately air tight chamber is formed surrounding said spools between each of said diaphragm means and cover plates.

RALPH H. CARTER.